US011911731B2

(12) United States Patent
Torniainen et al.

(10) Patent No.: US 11,911,731 B2
(45) Date of Patent: Feb. 27, 2024

(54) DROPLET GENERATOR

(71) Applicant: Hewlett-Packard Development Company, L.P., Spring, TX (US)

(72) Inventors: Erik D. Torniainen, Corvallis, OR (US); Alexander N. Govyadinov, Corvallis, OR (US); Pavel Kornilovich, Corvallis, OR (US); David P. Markel, Corvallis, OR (US); Richard W. Seaver, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 772 days.

(21) Appl. No.: 16/316,896

(22) PCT Filed: Oct. 21, 2016

(86) PCT No.: PCT/US2016/058235
§ 371 (c)(1),
(2) Date: Jan. 10, 2019

(87) PCT Pub. No.: WO2018/075069
PCT Pub. Date: Apr. 26, 2018

(65) Prior Publication Data
US 2019/0299169 A1 Oct. 3, 2019

(51) Int. Cl.
*B01F 33/30* (2022.01)
*B01F 23/41* (2022.01)
(Continued)

(52) U.S. Cl.
CPC .............. *B01F 23/41* (2022.01); *B01F 25/20* (2022.01); *B01F 25/31* (2022.01); *B01F 33/30* (2022.01);
(Continued)

(58) Field of Classification Search
CPC ........................... B01F 13/0059; B01F 33/302
(Continued)

(56) References Cited

U.S. PATENT DOCUMENTS 7,374,332 B2 * 5/2008 Higashino ........... B01F 13/0062
137/602
7,578,951 B2 8/2009 Dunfield et al.
(Continued)

FOREIGN PATENT DOCUMENTS

CN 1646903 7/2005
CN 102259040 11/2011
(Continued)

OTHER PUBLICATIONS

Chong et al., Active droplet generation in microfluidics, The Royal Society of Chemistry, Lab Chip, 16, pp. 35-58, 2016.
(Continued)

*Primary Examiner* — David L Sorkin
(74) *Attorney, Agent, or Firm* — Foley & Lardner LLP

(57) ABSTRACT

An immiscible droplet generation system may include a chip, a microfluidic channel integrated into the chip, an input to the microfluidic channel through which the microfluidic channel is to be filled with a first fluid that is to be moved through the microfluidic channel and a droplet generator. The droplet generator is integrated into the chip to generate a droplet of a second fluid, immiscible within the first fluid, and to inject the droplet into the first fluid in the microfluidic channel.

20 Claims, 2 Drawing Sheets

(51) Int. Cl.
*B01F 25/20* (2022.01)
*B01F 25/31* (2022.01)
*B01F 35/71* (2022.01)

(52) U.S. Cl.
CPC .................. *B01F 35/71755* (2022.01); *B01F 35/717612* (2022.01)

(58) Field of Classification Search
USPC ............................. 366/179.1, DIG. 1–DIG. 3
See application file for complete search history.

(56) References Cited

U.S. PATENT DOCUMENTS

| | | | | |
|---|---|---|---|---|
| 7,815,868 | B1 * | 10/2010 | Jones | B01F 33/302 204/601 |
| 9,108,173 | B2 | 8/2015 | Lee et al. | |
| 9,176,504 | B2 | 11/2015 | Chiou et al. | |
| 9,238,206 | B2 * | 1/2016 | Rotem | B01F 13/0062 |
| 2002/0137196 | A1 | 9/2002 | Miles et al. | |
| 2007/0110625 | A1 * | 5/2007 | Krishnamoorthy | B01F 33/3034 422/400 |
| 2009/0131543 | A1 * | 5/2009 | Weitz | A61K 9/113 516/54 |
| 2010/0018584 | A1 | 1/2010 | Bransky et al. | |
| 2010/0022680 | A1 * | 1/2010 | Karnik | B01F 11/0071 523/105 |
| 2011/0103176 | A1 * | 5/2011 | Van Dam | B01F 15/0462 366/154.1 |
| 2012/0236299 | A1 | 9/2012 | Chiou et al. | |
| 2013/0222453 | A1 | 8/2013 | Darling | |
| 2013/0244906 | A1 * | 9/2013 | Collins | B01L 3/502761 506/12 |
| 2014/0134623 | A1 * | 5/2014 | Hiddessen | B01F 33/3011 366/108 |
| 2014/0161685 | A1 | 6/2014 | Lee et al. | |
| 2014/0220350 | A1 * | 8/2014 | Kim | B01F 3/0811 428/402.21 |
| 2014/0248621 | A1 * | 9/2014 | Collins | G01N 33/4833 435/6.12 |
| 2014/0323317 | A1 | 10/2014 | Link et al. | |
| 2015/0034163 | A1 * | 2/2015 | Abate | B01F 5/0471 137/1 |
| 2015/0044696 | A1 * | 2/2015 | Dothie | F16K 99/0028 564/138 |
| 2015/0111787 | A1 * | 4/2015 | Shen | G01N 33/6848 506/12 |
| 2015/0125865 | A1 * | 5/2015 | Johnson | B01L 3/50273 435/6.12 |
| 2015/0337251 | A1 | 11/2015 | Yang et al. | |
| 2016/0008778 | A1 | 1/2016 | Weitz et al. | |

FOREIGN PATENT DOCUMENTS

| | | |
|---|---|---|
| CN | 103194383 | 7/2013 |
| CN | 104998704 | 10/2015 |
| EP | 1362634 | 11/2003 |
| EP | 1559476 | 8/2005 |
| JP | 2008151771 | 7/2008 |
| WO | 2011090396 | 7/2011 |
| WO | 2014138154 | 9/2014 |

OTHER PUBLICATIONS

Cornella et al., On-Demand Liquid Droplet Generation, Undergraduate Research Journal at UCCS, vol. 2.2, pp. 30-38, Jul. 2009.
Garstecki et al., Formation of droplets and bubbles in a microfluidic T-junction—scaling and mechanism of break- up, The Royal Society of Chemistry, Lab Chip, 6, pp. 437-446, 2006.
Rhee et al., Versatile on-demand droplet generation for controlled encapsulation, AIP Biomicrofluidics Fundamentals, Perspectives & Applications, http://scitation.aip.org/content/aip/journal/bmf/8/30/10,1063/1.4874715.
Theberge et al., Microdroplets in Microfluidics: An Evolving Platform for Discoveries in Chemistry and Biology, Angew. Chem. Int. Ed. 49, pp. 5846-5868, 2010.
Utada et al., Dripping, Jetting, Drops, and Wetting: The Magic of Microfluidics, MRS Bulletin, vol. 32, pp. 702-708, 2007.
International Search Report dated Oct. 21, 2016 for PCT/US2016/058235, Applicant Hewlett-Packard Development Company, L.P.
Bransky et al., A microfluidic droplet generator based on a piezoelectric actuator, Lab Chip, 9, 2009, pp. 516-520.

* cited by examiner

DROPLET GENERATOR

BACKGROUND

Droplet generators create droplets of a dispersed fluid suspended in another immiscible fluid or carrier fluid. The generated droplets may be conveyed by the carrier fluid for sensing or other processes. Droplet generators are utilized in many processes such as biological analysis.

DETAILED DESCRIPTION OF EXAMPLES

Figure 1:
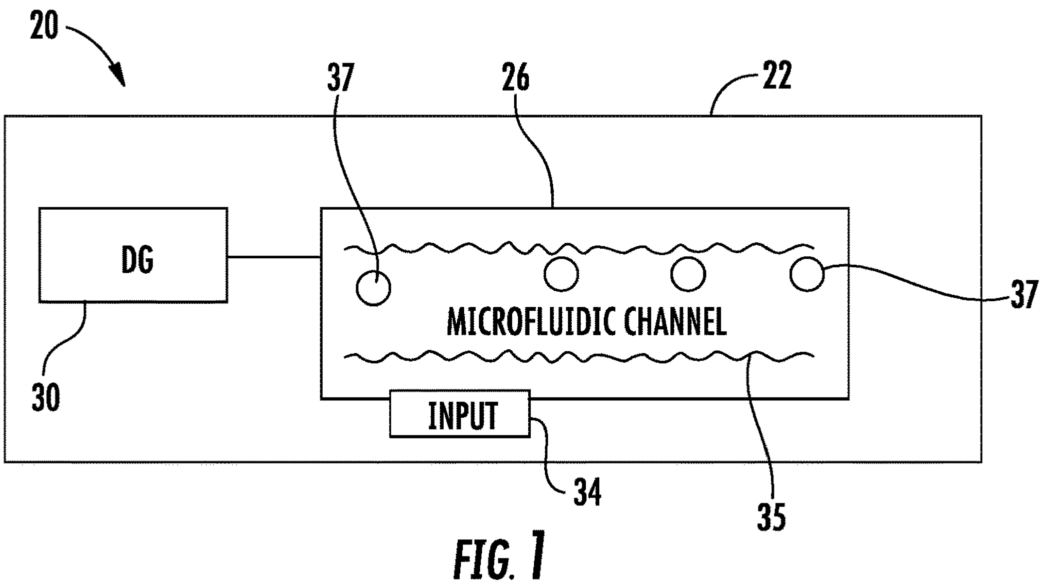
FIG. 1 is a schematic diagram of an example immiscible droplet generation system.

Droplet generation typically involves using external pumps and continuously flowing fluids. Such droplet generators are often complicated, large and expensive. Disclosed herein are examples of droplet generators and immiscible droplet generation systems that integrate a microfluidic channel and a droplet generator into a die or chip. As a result, the complexity, size and cost of the drop generator and droplet generation system may be reduced. In addition, the integration of the microfluidic channel and the droplet generator into the chip provides enhanced control over the characteristics of the droplets that are generated and enhanced interaction with such generated droplets.

As will be appreciated, examples provided herein may be formed by performing various microfabrication and/or micromachining processes on a substrate to form and/or connect structures and/or components. The substrate of the chip may comprise a silicon based wafer or other such similar materials used for microfabricated devices (e.g., glass, gallium arsenide, plastics, etc.). Example devices may comprise microfluidic channels, fluid actuators, and/or volumetric chambers. Microfluidic channels and/or chambers may be formed by performing etching, microfabrication processes (e.g., photolithography), or micromachining processes on a substrate. Accordingly, microfluidic channels and/or chambers may be defined by surfaces fabricated on the substrate of a microfluidic device. In some implementations, microfluidic channels and/or chambers may be formed by an overall package, wherein multiple connected package components that combine to form or define the microfluidic channel and/or chamber.

In some examples described herein, at least one dimension of a microfluidic channel and/or capillary chamber may be of sufficiently small size (e.g., of nanometer sized scale, micrometer sized scale, millimeter sized scale, etc.) to facilitate pumping of small volumes of fluid (e.g., picoliter scale, nanoliter scale, microliter scale, milliliter scale, etc.). For example, some microfluidic channels may facilitate capillary pumping due to capillary force. In addition, examples may couple at least two microfluidic channels to a microfluidic output channel via a fluid junction. At least one fluid actuator may be disposed in each of the at least two microfluidic channels, and the fluid actuators may be selectively actuated to thereby pump fluid into the microfluidic output channel.

The microfluidic channels may facilitate conveyance of different fluids (e.g., liquids having different chemical compounds, different concentrations, etc.) to the microfluidic output channel. In some examples, fluids may have at least one different fluid characteristic, such as vapor pressure, temperature, viscosity, density, contact angle on channel walls, surface tension, and/or heat of vaporization. It will be appreciated that examples disclosed herein may facilitate manipulation of small volumes of liquids.

A fluid actuator, as used herein may correspond to an inertial pump. Fluid actuators that may be implemented as inertial pumps described herein may include, for example, thermal actuators, piezo-membrane based actuators, electrostatic membrane actuators, mechanical/impact driven membrane actuators, magnetostrictive drive actuators, electrochemical actuators, other such microdevices, or any combination thereof. In some examples, fluid actuators may be formed in microfluidic channels by performing various microfabrication processes.

In some examples, a fluid actuator may correspond to an inertial pump. As used herein, an inertial pump corresponds to a fluid actuator and related components disposed in an asymmetric position in a microfluidic channel, where an asymmetric position of the fluid actuator corresponds to the fluid actuator being positioned less distance from a first end of a microfluidic channel as compared to a distance to a second end of the microfluidic channel. Accordingly, in some examples, a fluid actuator of an inertial pump is not positioned at a mid-point of a microfluidic channel. The asymmetric positioning of the fluid actuator in the microfluidic channel facilitates an asymmetric response in fluid proximate the fluid actuator that results in fluid displacement when the fluid actuator is actuated. Repeated actuation of the fluid actuator causes a pulse-like flow of fluid through the microfluidic channel.

In some examples, an inertial pump includes a thermal actuator having a heating element (e.g., a thermal resistor) that may be heated to cause a bubble to form in a fluid proximate the heating element. In such examples, a surface of a heating element (having a surface area) may be proximate to a surface of a microfluidic channel in which the heating element is disposed such that fluid in the microfluidic channel may thermally interact with the heating element. In some examples, the heating element may comprise a thermal resistor with at least one passivation layer disposed on a heating surface such that fluid to be heated may contact a topmost surface of the at least one passivation layer. Formation and subsequent collapse of such bubble may generate circulation flow of the fluid. As will be appreciated, asymmetries of the expansion-collapse cycle for a bubble may generate such flow for fluid pumping, where such pumping may be referred to as "inertial pumping." In other examples, a fluid actuator corresponding to an inertial pump may comprise a membrane (such as a piezoelectric membrane) that may generate compressive and tensile fluid displacements to thereby cause fluid flow.

As will be appreciated, a fluid actuator may be connected to a controller, and electrical actuation of a fluid actuator (such as a fluid actuator of an inertial pump) by the controller may thereby control pumping of fluid. Actuation of a fluid actuator may be of relatively short duration. In some examples, the fluid actuator may be pulsed at a particular frequency for a particular duration. In some examples, actuation of the fluid actuator may be 1 microsecond (μs) or less. In some examples, actuation of the fluid actuator may be within a range of approximately 0.1 microsecond (μs) to approximately 10 milliseconds (ms). In some examples described herein, actuation of a fluid actuator comprises electrical actuation. In such examples, a controller may be electrically connected to a fluid actuator such that an electrical signal may be transmitted by the controller to the fluid actuator to thereby actuate the fluid actuator. Each fluid actuator of an example microfluidic device may be actuated according to actuation characteristics. Examples of actuation characteristics include, for example, frequency of actuation, duration of actuation, number of pulses per actuation, intensity or amplitude of actuation, phase offset of actuation. As will be appreciated in some examples, at least one actuation characteristic may be different for each fluid actuator. For example, a first fluid actuator may be actuated according to first actuation characteristics and a second fluid actuator may be actuated according to second actuation characteristics, where the actuation characteristics for a respective fluid actuator may be based at least in part on a desired concentration of a respective fluid in a fluid mixture, a fluid characteristic of the respective fluid, a fluid actuator characteristic, the length and cross-sectional area of a respective channel, and/or other such characteristics or input/output variables. For example, the first fluid actuator may be actuated a first number of times and the second fluid actuator may be actuated a second number of times such that a desired concentration of a first fluid and a desired concentration of a second fluid are present in a fluid mixture.

Disclosed herein is an example immiscible droplet generation system. The example system may comprise a chip, a microfluidic channel integrated into the chip, an input to the microfluidic channel through which the microfluidic channel is to be filled with a first fluid that is to be moved through the microfluidic channel and a droplet generator. The droplet generator is integrated into the chip to generate a droplet of a second fluid, immiscible within the first fluid, and to inject the droplet into the first fluid in the microfluidic channel.

Disclosed herein is an example method for the generation of immiscible droplets. The method may comprise filling a microfluidic channel on a chip with a first fluid and activating a droplet generator integrated in the chip to generate a droplet of a second fluid, immiscible within the first fluid. The generated droplet is injected into the first fluid within the microfluidic channel.

Disclosed herein is an example immiscible droplet generation system that may comprise a chip, a microfluidic channel integrated into the chip, a pump integrated into the chip to move a first fluid within and along the microfluidic channel and a droplet generator integrated into the chip to generate droplets of a second fluid, immiscible within the first fluid. The droplet generator injects the droplets into the first fluid in the microfluidic channel. The system further comprises a controller to selectively activate the pump and the droplet generator to control at least one of a size of the droplets, a frequency at which the droplets are injected into the first fluid and a rate at which the droplets are conveyed along the microfluidic channel.

FIG. 1 is a schematic diagram of an example immiscible droplet generation system 20. System 20 integrates a microfluidic channel and a droplet generator into a chip. As a result, the complexity, size and cost of the drop or droplet generator and droplet generation system may be reduced. In addition, the integration of the microfluidic channel and the droplet generator into the chip provides enhanced control over the characteristics of the droplets that are generated and enhanced interaction with such generated droplets. System 20 comprises chip 22, microfluidic channel 26 and droplet generator 30. For purposes of this disclosure, the term "integrated" with respect to a structure or component being integrated into a chip, such as chip 22, means that at least portions of the component or structure, such as the walls of the channel, the walls or opening of an outlet or nozzle, the resistor of a heater, the layers of a thin-film transistor, or structures of a micro electromechanical system or device are at least partially integrally formed as part of a single unitary body with a layer of the chip 22 or are fixedly attached to the chip, are captured and/or embedded in the chip so as to be supported by the chip.

Chip 22 comprises a substrate formed from a material or a combination of materials that serves as a platform for system 20. Chip 22 may support various electronic components or devices. For example, chip 22 may support various electrical transistors in other MEMS devices. Chip 22 may provide communication between such electronic components or devices using wiring or electrically conductive traces printed or otherwise formed upon chip 22 may be formed from various materials such as a polymeric material, a glass material or a ceramic material. In one implementation, chip 22 is formed from a silicon based material.

Microfluidic channel 26 comprises a microfluidic passage extending into or within chip 22 and through which fluid is carried and conveyed. For purposes of this disclosure, the term "microfluidic" refers to volumes containing fluids or through such fluid flow, wherein such volumes have at least one dimension in the range of a micrometer or tens of micrometers. For purposes of this disclosure, the term "microfluidic" also refers to such volumes have at least one dimension smaller than a microliter.

Microfluidic channel 26, schematically shown, may have a variety of different sizes, shapes and configurations. For example, microfluidic channel 26 may have various branches stemming from a central or main channel. Microfluidic channel 26 may be serpentine in nature. Microfluidic channel 26 may have a uniform cross-sectional area or may have different portions with different cross-sectional areas or sizes. Microfluidic channel 26 may convey fluid between various active devices such as microfluidic fluid mixers, heaters and sensors. The direction of flow within microfluidic channel 26 may be promulgated and controlled by micro electromechanical system (MEMS) valves and selectively controlled pumps, such as an inertial pumps.

In the example illustrated, microfluidic channel 26 receives a first carrier fluid 35 through an input 34. The carrier fluid 35 is a fluid in which the fluid of the generated droplets is immiscible. In one implementation, the carrier fluid 35 may comprise an oil. In one implementation, input 34 is releasably or removably connectable to an external or remote source of the carrier fluid 35. For example, in one implementation, input 34 may comprise a port or mouth to receive the carrier fluid from an external source. For purposes of this disclosure, the term "releasably" or "removably" with respect to an attachment or coupling of two structures means that the two structures may be repeatedly connected and disconnected to and from one another without material damage to either of the two structures or their functioning. In another implementation, input 34 may be connected to an onboard reservoir provided on chip 22 and containing the carrier fluid 35.

Droplet generator (DG) 30 comprises a device integrated into chip 22 to generate a droplet 37 of a second fluid, a fluid immiscible within the first fluid or the carrier fluid. Droplet generator 30 injects the droplet 37 of the immiscible fluid into the first carrier fluid within microfluidic channel 26.

Such injection occurs without the droplet passing through air. In one implementation, the immiscible fluid comprises water or another liquid that is immiscible within the carrier fluid within microfluidic channel 26. The immiscible fluid may itself contain multiple constituents such as various chemicals, inorganic materials, cells or other biological organic elements.

In one implementation, droplet generator 30 comprises a fluid actuator that directs the immiscible fluid into the carrier fluid flowing within microfluidic channel 26 to form a slug or droplet 37. In one implementation, the immiscible fluid is directed through a T-intersection with microfluidic channel 26. In another implementation, the fluid actuator directs the immiscible fluid through a tapering nozzle opening immersed or extending into the carrier fluid within microfluidic channel 26. The T intersection or the nozzle may be formed by walls integrally formed as part of a single unitary body with chip 22. In one implementation, the immiscible fluid is directed through a horizontal opening or nozzle. In another implementation, the missile fluid is directed to a vertical opening or nozzle that extends below the surface of the carrier fluid.

Figure 2:
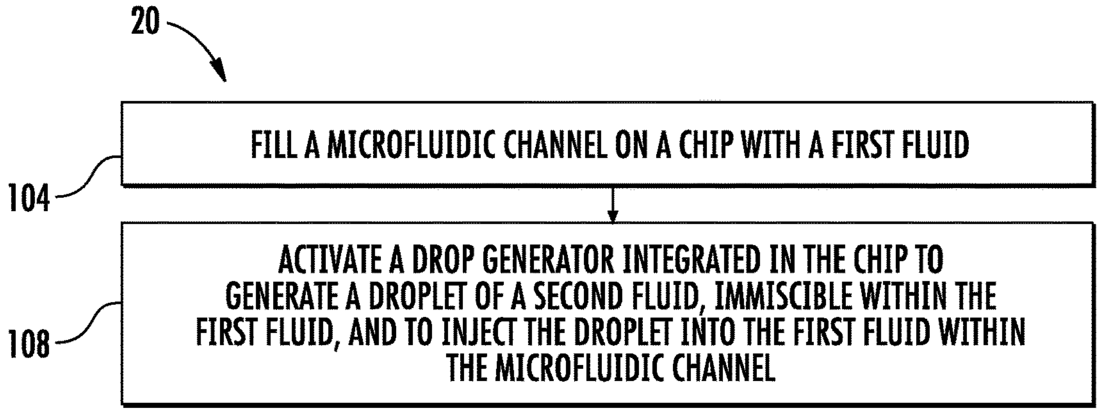
FIG. 2 is a flow diagram of an example method for generating immiscible fluid droplets.

FIG. 2 is a flow diagram of an example method 100 for generating immiscible droplets. Method 100 facilitates the generation of immiscible droplets in a less complex and less costly fashion. Although method 100 is described in the context of being carried out by system 20, it should be appreciated that method 100 may be carried out with any of the system described hereafter as well as other systems having a droplet generator in a microfluidic channel integrated into a chip.

As indicated by block 104, a microfluidic channel, such as microfluidic channel 26, is filled with the first fluid, a carrier fluid. One example such a carrier fluid is an oil, wherein the immiscible fluid is water. As should be appreciated, different combinations of the carrier fluid in the immiscible fluid are possible. In one implementation, the carrier fluid is continuously supplied to channel 26 so as to flow within channel 26. In another implementation, the carrier fluid is controllably supplied or intermittently supplied to channel 26 to vary the movement of the carrier fluid within microfluidic channel 26. For example, in some circumstances, flow of the carrier fluid within microchannel 26 may be temporally paused and then re-instituted as desired.

As indicated by block 108, drop or droplet generator 30, integrated into chip 22, is activated to generate a droplet 37 of a second fluid, immiscible within the first carrier fluid. The droplet 37 of the immiscible fluid is injected into the first carrier fluid 35 within the microfluidic channel 26. Thereafter, the droplet 37 of the immiscible fluid may be selectively and controllably conveyed to various locations on the chip 22 for sensing, mixing, heating or other interactions.

Figure 3:
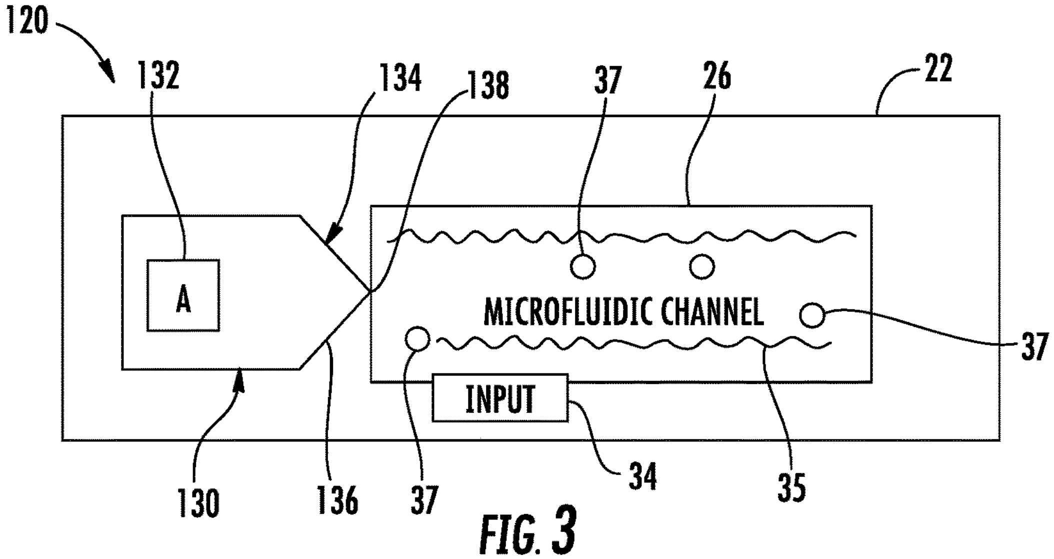
FIG. 3 is a schematic diagram of an example immiscible droplet generation system.

FIG. 3 is a schematic diagram of an example immiscible droplet generation system 120. As with system 20 described above, system 120 integrates a microfluidic channel and a droplet generator into a chip. System 120 is similar to system 20 except that system 120 is specifically illustrated as comprising a droplet generator 130 comprising fluid actuator 132 and nozzle 134. Those remaining components or elements of system 120 which correspond to components of system 20 are numbered similarly.

Fluid actuator (A) 132 propels or moves the immiscible fluid through nozzle 132. In one implementation, actuator 132 comprises an inertial pump. Fluid actuator 132, implemented as an inertial pump, may include, for example, thermal actuators, piezo-membrane based actuators, electrostatic membrane actuators, mechanical/impact driven membrane actuators, magnetostrictive drive actuators, electrochemical actuators, other such microdevices, or any combination thereof. In one implementation, fluid actuator 132 comprises a thermal actuator in the form of a resistor that is sufficiently heated to vaporize the adjacent immiscible fluid to create an expanding bubble that moves fluid through nozzle 132 to create a droplet of the immiscible fluid.

Nozzle 134 opens into microfluidic channel 26. Nozzle 134 comprises a tapered portion 136, narrowing to an opening 138 within microfluidic channel 26. The tapering of nozzle 134 facilitates enhanced control over the characteristics and size of the droplet of the immiscible fluid injected into the carrier fluid within microfluidic channel 26. The characteristics of the generated droplet may further be based upon the characteristics of fluid actuator 132, the distance separating the fluid actuator 132 from nozzle 134, the characteristics of the micro leak channel extending between actuator 132 and nozzle 134 as well as the performance parameters of actuator 132.

In one implementation, fluid actuator 132 and nozzle 134 cooperates to form a droplet of at least one pico liter and up to 100 pico liters. In one implementation, fluid actuator 132 and nozzle 134 cooperate to form a droplet of between 3 and 5 pico liters, and nominally four pico liters. In one implementation, nozzle opening 138 has a dimension of approximately 10 μm, tapering portion 136 has a length of approximately 20 μm, fluid actuator 132 is spaced from nozzle opening 138 by approximately 50 μm and fluid actuator 132 comprises a 20 micrometer×10 micrometer thermal resistor. In yet other implementations, the various characteristics of fluid actuator 132 and nozzle 134 may be varied to generate other sized droplets.

Figure 4:
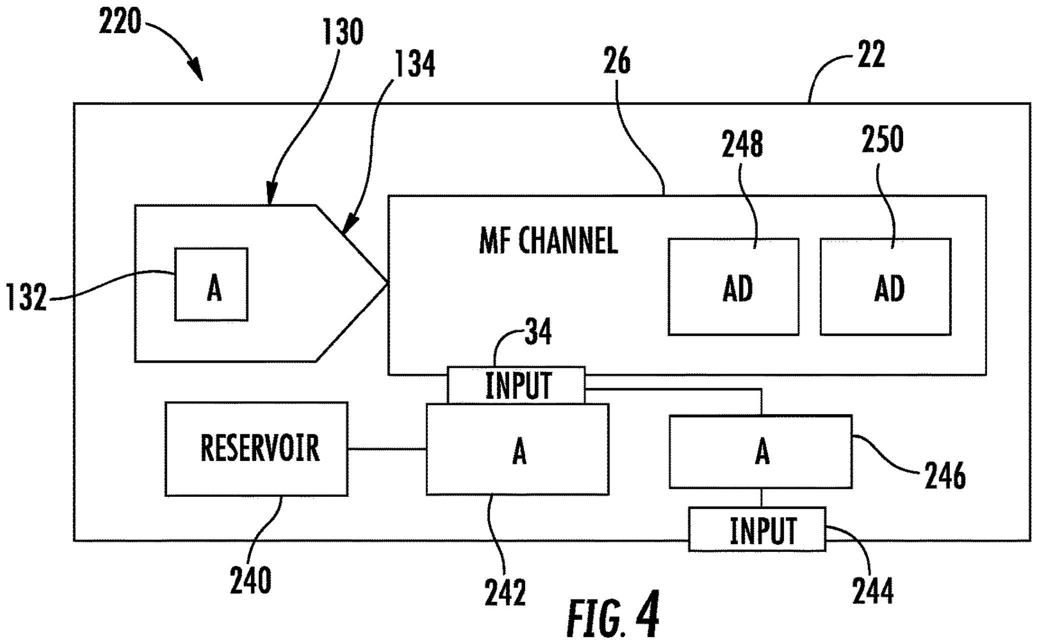
FIG. 4 is a schematic diagram of an example immiscible droplet generation system.

FIG. 4 is a schematic diagram of an example immiscible droplet generation system 220. As with system 20 described above, system 220 integrates a microfluidic channel and a droplet generator into a chip. System 220 is similar to system 120 except that system 220 is specifically illustrated as additionally comprising reservoir 240, fluid actuator 242, external input 244, fluid actuator 246 and active devices 248, 250. Those remaining components or elements of system 220 which correspond to components of system 120 are numbered similarly.

Reservoir 240 comprises a chamber or container integrated into chip 22 for containing or storing the carrier fluid in which the immiscible droplets are injected. Fluid actuator 242 comprises a device to selectively drive, move or pump the carrier fluid from reservoir 240 through input 34 into microfluidic channel 26. In one implementation, fluid actuator 242 may comprise an inertial pump. In one implementation, fluid actuator 242 comprises a thermal resistor integrated into chip 22 which, upon receiving electrical current, emits heat sufficient to vaporize the carrier fluid to create a bubble and expel carrier fluid into microfluidic channel 26. In one implementation, the thermal resistor is pulsed are activated at a frequency to create a flow of the carrier fluid into and within microfluidic channel 26.

Input 244 comprises a port, well or the like for receiving a carrier fluid from an external source, a source distinct from chip 22. Input 244 is configured to be releasably or removably connected to a plug or other interface with an external carrier fluid source. Input 244 supplies the externally supplied carrier fluid to fluid actuator 246.

Fluid actuator 246 comprises a device to selectively drive, move or pump the carrier fluid from input 244 through input 34 into microfluidic channel 26. In one implementation, fluid actuator 246 may comprise an inertial pump. In one implementation, fluid actor 246 comprises a thermal resistor integrated into chip 22 which, upon receiving electrical current, emits heat sufficient to vaporize the carrier fluid to create a bubble and expel carrier fluid into microfluidic channel 26. In one implementation, the thermal resistor is pulsed are activated at a frequency to create a flow of the carrier fluid into and within microfluidic channel 26. In some implementations, reservoir 240 and fluid actuator 242 or input 244 and fluid actuator 246 may be omitted.

Active devices 248, 250 comprise devices situated along microfluidic channel 26 or supplied with fluid by microfluidic channel 26. Active devices 248, 250 comprise components integrated into chip 22 which interact with the carrier fluid and the generated droplets of immiscible fluid or the generated droplets of immiscible fluid. Examples of active devices 248, 250 include, but are not limited to, fluid heaters, mixers or agitators, fluid marking devices and sensors. Examples of such sensors include, but are not limited to, impedance sensors, optical sensors and the like. Although active devices 248, 250 are schematically illustrated as being adjacent to one another, active devices 248, 250 may be located with distinct branches or legs of channel 26, wherein fluid is selectively directed to either of such active devices 248, 250.

Figure 5:
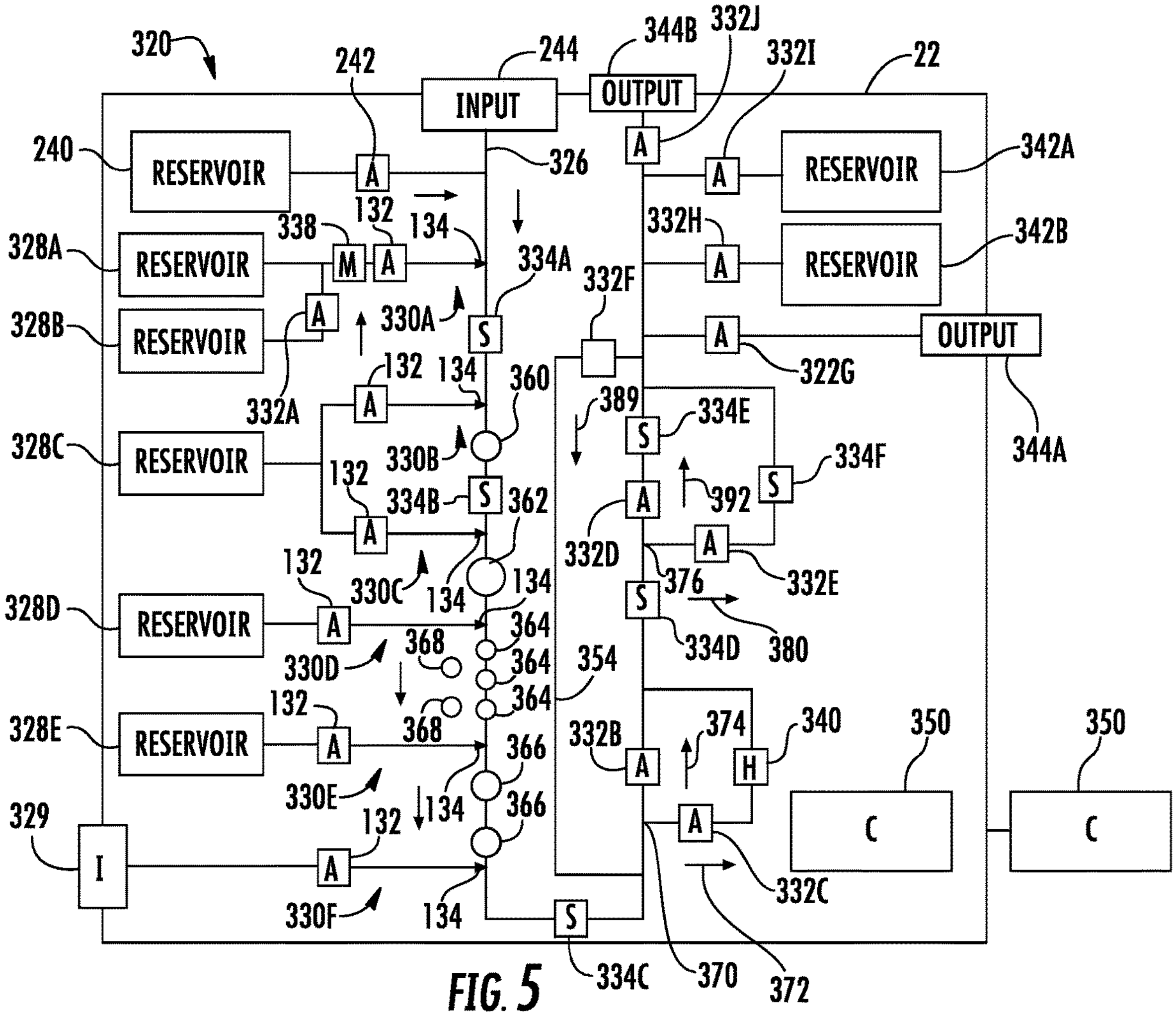
FIG. 5 is a schematic diagram of an example immiscible droplet generation system.

FIG. 5 is a schematic diagram of an example immiscible droplet generation system 320. As with system 20 described above, system 320 integrates a microfluidic channel and a droplet generator into a chip. System 320 is similar to system 220 except that system 320 is specifically illustrated as additionally comprising microfluidic channel 326, immiscible fluid supply reservoirs 328A, 328B, 328C, 328D and 328E (collectively referred to as reservoirs 328), external source immiscible fluid supply input (I) 329, droplet generators 330A, 330B, 330C, 330D, 330 and 330F (collectively referred to as droplet generators 330), fluid actuators 332A, 332B, 332C, 332D, 332E, 332F, 332G, 332H, 332I, 332J (collectively referred to as actuators 332), sensors 334A, 334B, 334C, 334C, 334E, 334F (collectively referred to as sensors 334), mixer 338, heater 340, output reservoir 342A, output reservoir 342B (collectively referred to as output reservoir 342), external output 344A, external output 344 (collectively referred to external output 344) and controller 350. Those remaining components or elements of system 320 which correspond to components of system 220 are numbered similarly.

Microfluidic channel 326 is an example of microfluidic channel 26 described above. Microfluidic channel 326 is schematically illustrated with a darkened or thicker line in FIG. 5. As shown by FIG. 5, microfluidic channel 326 comprises multiple branches or segments, forming a complex circuit of fluid passages within or on chip 22. In the example illustrated, microfluidic channel 326 has a loopback or U-shape extending from external input 244 to external output 344B. Along the way, microfluidic channel 326 is fluidly connectable to carrier fluid supply reservoir 240, each of reservoirs 328, input 329, output reservoir 342 and external output 344A. In the example illustrated, microfluidic channel 326 has a kickback or recirculation segment or portion 354 through which the carrier fluid, and carried droplets, may be recirculated back through portions of microfluidic channel 326. Microfluidic channel 326 may have a variety of different patterns, circuits or layouts depending upon the number, type an arrangement of reservoirs 328, droplet generators 330, reservoir 342 and active devices such as fluid actuators 332, sensors 334, mixers 338 and heaters 340 integrated into chip 22.

Reservoirs 328 supply immiscible fluids for the generation of immiscible droplets. In one implementation, some of reservoirs 328 may supply different immiscible fluids such as fluid having different chemical compositions or similar fluids having different densities or concentrations. Although system 320 is illustrated as comprising five different reservoirs 328, in other implementations, system 320 may include a greater or fewer of such reservoirs 328. In the example illustrated, reservoir 328A is arranged to either supply fluid directly to droplet generator 330A or to be connected with reservoir 328B, by fluid actuator 332A, wherein the fluid from reservoir 328A and 328B may be mixed by mixer 338 and supplied to droplet generator 330A.

Droplet generators 330 are similar to droplet generator 130 described above. Each of droplet generators 330 comprises a fluid actuator 132 and an associated nozzle 134 (schematically shown as an arrowhead) which opens into microfluidic channel 326 to inject droplets of the immiscible fluid into the carrier fluid within microfluidic channel 326. In the example illustrated, the different droplet generators 330 may have differently sized nozzle openings or may have fluid actuators 132 with different characteristics such that the different droplet generators 330 generate and inject differently sized droplets into the carrier fluid of microfluidic channel 326. For example, as schematically illustrated, droplet generator 330C may generate droplets 360 (schematically illustrated) having a first size, such as a first diameter, while droplet generator 330C may generate droplets 362 having a second different size, such as having a second larger diameter.

Some of the droplet generators 330 may inject their respective generated droplets at distinct frequencies into the carrier fluid within microfluidic channel 326. As schematically illustrated in FIG. 5, in one implementation, droplet generator 330D may inject droplets 364, of a first size, at a first frequency into the carrier fluid within microfluidic channel 326. In contrast, droplet generator 330E may inject droplets 366, of a second larger size, at a second lesser frequency, into the carrier fluid within microfluidic channel 326. As further schematically illustrated by 5, in some implementations, some of the different droplet generators 330 are adjustable, being able to inject generated droplets at a selected or adjustable frequency into the carrier fluid of microfluidic channel 326. For example, as shown by FIG. 5, droplet generator 330D may be provided with alternative operational parameter so as to inject fluid droplets 368 at a different frequency as compared to the injection of droplets 364 into the carrier fluid of microfluidic channel 326. In one implementation, some of droplet generators 330 may be further adjustable to inject a selected size/volume of droplets into the carrier fluid of microfluidic channel 326, such as through selective actuation of the fluid actuators 132.

Fluid actuators 332 comprise those actuators which direct the flow of fluid within or along chip 22, distinct from the fluid actuators that move the fluid through nozzles 134. Fluid actuator 332 may cooperate with one another to form microfluidic valves, controlling the direction of flow or the rate of flow through the various channels or branches of microfluidic channel 326. As with fluid actuators 132, fluid actuator 332 may comprise pumps integrated into chip 22.

In some implementations, fluid actuator 332 may comprise inertial pumps integrated into chip 22. Fluid actuator 132, implemented as an inertial pump, may include, for example, thermal actuators, piezo-membrane based actuators, electrostatic membrane actuators, mechanical/impact driven membrane actuators, magnetostrictive drive actuators, electrochemical actuators, other such microdevices, or any combination thereof. In one implementation, fluid actuator 132 comprises a thermal actuator in the form of a resistor that is sufficiently heated to vaporize the adjacent immiscible fluid to create an expanding bubble that moves fluid along microfluidic channel 326 or other microfluidic channels of chip 22.

Sensors 334 comprise electronic components integrated into chip 22 that facilitate the sensing or determination of the characteristic or multiple characteristics of the immiscible fluid droplets being carried by the carrier fluid within microfluidic channel 326. In one implementation, some of sensors 334 may comprise optical sensors. In one implementation, some of sensors 334 may comprise impedance sensors may be utilized to count the number of cells or particles in a droplet. In one implementation, some of sensors 334 may count the number of droplets passing a certain point along microfluidic channel 36 or the frequency at which such droplets past a certain point along microfluidic channel 36. Signals indicating the number of droplets or the rate at which such droplets are being conveyed to serve as feedback for controlling the rate at which the carrier fluid is moved through microfluidic channel 326 and/or the frequency at which immiscible fluid droplets are generated by at least some of the droplet generators 330.

Mixer 338 comprises a device to agitate or mix fluid. Heater 340 comprises a device to heat the carrier fluid and the encapsulated droplets being carried by the carrier fluid. In one implementation, heater 340 may comprise a thermal resistor formed or fabricated within or on chip 22.

Reservoirs 342 comprise chambers, cavities or containers integrated into chip 22 to receive fluid discharged from microfluidic channel 326. Although system 320 is illustrated as comprising two distinct reservoirs 342, in other implementations, system 320 may comprise greater than two distinct reservoirs 342. The distinct reservoirs 342 facilitate separation of different droplets of immiscible fluid based upon their sensed characteristics. For example, those for droplets having a first characteristic may be directed to reservoir 342A all those droplets having a second characteristic may be directed to reservoir 3426.

Outputs 344 comprise outlets, openings or ports to be releasably or removably connected to an external fluid recipient. Although system 320 is illustrated as comprising two distinct outlets 344, in other implementations, system 320 may comprise a single outlet 344 or greater than two distinct outlets 344. In some implementations, outputs 344 may be omitted. The distinct outputs 344 facilitate separation of different droplets of immiscible fluid based upon their sensed characteristics. For example, those for droplets having a first characteristic may be directed to output 344A while those droplets having a second characteristic may be directed to output 344B.

Controller 350 comprises a processing unit that receives signals from sensors 334, that may receive signals from a user input and that generates control signals controlling the operation actuator 242, droplet ejectors 330, actuator 332, mixer 338 and heater 340. For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 350 may be embodied as part of one or more application-specific integrated circuits (ASICs). Unless otherwise specifically noted, the controller is not limited to any specific combination of hardware circuitry and software, nor to any particular source for the instructions executed by the processing unit.

In the example illustrated, controller 350 is integrated into chip 22, being supported by chip 22. Such an implementation, controller 350 communicates with actuator 242, droplet ejectors 330, actuator 332, mixer 338 and heater 340 across electrically conductive traces supported by chip 22. As shown by broken lines, in other implementations, controller 350 may be external to chip 22, wherein chip 22 comprises a plug-in or electrical contact pads by which the external or remote controller 350 contacts in communicates with actuator 242, droplet ejectors 330, actuator 332, mixer 338 and heater 340. In some implementations, the control of actuator 242, droplet ejectors 330, actuator 332, mixer 338 and heater 340 may be distributed or shared amongst multiple controllers, some of which may be supported by chip 22 and others of which are external and connected to chip 22.

In the example illustrated, controller 350 outputs control signals to fluid actuator 242 to connect or disconnect the carrier fluid 37 (shown in 1) within reservoir 240 to microfluidic channel 326. Controller 350 further controls the rate at which carrier fluid 37 from reservoir 240 is applied to microfluidic channel 326, controlling the rate at which generated droplets are conveyed along microfluidic channel 326.

In the example illustrated, controller 350 outputs control signals to actuator 302A, controlling whether or not the immiscible fluid within reservoir 328B is mixed with the immiscible fluid contained in reservoir 328A prior to be formed into a droplet by droplet generator 330A. In the example illustrated, control 350 may further output control signals to mixer 338 to control the mixing of the immiscible fluids from reservoirs 328A and 328B. Controller 350 may further output control signals to droplet generator 330A to control when droplets are generated, if at all, and the frequency of generation of such droplets.

In the example illustrated, controller 350 outputs control signals to droplet generators 330B and 330C, namely actuators 132. As a result, controller 350 may control the size of droplets of the immiscible fluid from reservoir 328C. Controller 350 may concurrently generate droplets 360 and 362, alternately generate droplets 360, 362 or output an uninterrupted series of one of droplets 360, 362 without generating any of the other sized droplets 360, 362.

In the example illustrated, controller 350 may output control signals to selectively controlling the frequency of the droplets being generated by droplet generators 330D and 330E. In some implementations controller 350 may control the frequency at which each of the droplet generators 330C and 330D generate droplets. In circumstances where input 329 is fluidly coupled to an external immiscible fluid source, controller 350 may further output control signals to actuator 132, controlling the frequency at which droplets of the immiscible fluid received through input 329 are injected into the carrier fluid within microfluidic channel 326. The term "fluidly coupled" shall mean that two or more fluid transmitting volumes are connected directly to one another or are connected to one another by intermediate volumes or spaces such that fluid may flow from one volume into the other volume, either freely or upon opening of a valve or the like.

In the example illustrated, controller 350 may output control signals to actuator 332 to selectively control the direction or route of the generated droplets being carried by the carrier fluid within microfluidic channel 326. The relative activation frequencies and/or fluid driving forces (the magnitude of pumping force exerted upon the fluid) of the different fluid actuators 332 may be varied to control the direction of fluid flow. The frequency and/or force at which carrier fluid is driven by a fluid actuator 332 towards an interconnection relative to the frequency and/or force at which fluid is driven by another fluid actuator 332 or other fluid actuators 332 of other microfluidic channels may control whether or not the driven carrier fluid passes through and across the interconnection and is output from the microfluidic channel or whether or not the driven fluid does not exit the microfluidic channel, but simply blocks the ingress of carrier fluid being driven by other fluid actuators in other microfluidic channels. The relative frequency at which a particular fluid actuator 332 is driven relative to the frequency at which other fluid actuators 332 are driven may also control not only where fluid is conveyed, but the content of the fluid being conveyed. The relative frequencies of the different fluid actuators may be adjusted to control what percentage of the carrier fluid being conveyed by a first microfluidic channel is from a second microfluidic channel and what percentage of the fluid being conveyed by the first microfluidic channel is from a third microfluidic channel and so forth.

For example, at the junction 370, controller 350 may generate control signals controlling the pulse or frequency at which fluid actuator 332B and 332C are actuated, thereby controlling whether the carrier fluid, and the carried droplets, flows in the direction indicated by arrow 372 or flows in the direction indicated by arrow 374. In such a fashion, controller 350 may control whether individual droplets are heated by heater 340 or skip heater 340.

Likewise, at junction 376, controller 350 may output control signals to actuators 332D and 332E controlling the relative activation frequencies of such actuators to control whether the carrier fluid, and the carried droplets, flow in the direction indicated by arrow 380 or in the direction indicated by arrow 382. In such a fashion, controller 350 may control whether individual droplets sensed by sensor 334E or sensor 334F. For example, sensors 334E and 334F may be different so as to sense different characteristics of immiscible droplets. In some implementations, sensors 334E and 334F may have different sensitivities better suited for different types of droplets.

In the example illustrated, controller 350 may output control signals to actuator 332F in other actuators so as to control whether or not the carrier fluid and the carried droplets continue to flow towards output 334B or are recirculated in the direction indicated by arrow 384. By effectuating recirculation, controller 350 may circulate the droplets back across heater 340 or either of sensors 334E, 334F. By selectively outputting control signals to actuators 332G, 332H, 332I and 332J, controller 350 may control the destination of the droplets being carried by the carrier fluid within microfluidic channel 326. For example, such droplets may be directed to reservoir 342A, reservoir 342B, output 344A or output 344B.

In the example illustrated, controller 350 may receive signals from sensors 334 indicating the rate at which droplets are being conveyed along microfluidic channel 326. Controller 350 may further utilize such signals as feedback to dynamically control droplet generators 330 to ensure a desired frequency and/or size of droplets are being generated. Using signals from individual sensors 334, controller 350 may effectively track individual droplets as they move along microfluidic channel 326. As a result, controller 350 may control and direct the path of individual droplets. Such control may facilitate faster processing times as the generation of droplets by the different droplet generators from the different reservoirs 328 and their routing through the circuit provided by microfluidic channel 326 may be controlled to reduce or eliminate bottlenecks or queues of droplets across the various sensing, heating, mixing or other interaction stations along microfluidic channel 326.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An immiscible droplet generation system comprising:
- a chip;
- a microfluidic channel integrated into the chip;
- an input fluidically coupled to the microfluidic channel to permit filing of a first fluid into the microfluidic channel;
- a droplet generator integrated into the chip and fluidically coupled to the microfluidic channel, the droplet generator configured to:
  - generate a droplet of a second fluid, immiscible within the first fluid, and
  - inject the droplet of the second fluid into the first fluid when the first fluid is present in the microfluidic channel,
- wherein the droplet of the second fluid is injected into the first fluid without passing through air, and wherein the droplet of the second fluid generated has a size ranging from 1 picoliter to 100 picoliters; and
- a sensor integrated into the chip along the microfluidic channel downstream of the droplet generator, the sensor configured to determine a frequency at which droplets generated by the droplet generator pass a predetermined point in the microfluidic channel.

2. The system of claim 1, wherein the droplet generator comprises:
- a nozzle integrated into the chip; and
- a fluid actuator including a resistor capable of vaporizing the immiscible fluid thereby forming an expanding bubble which passes through the nozzle forming the immiscible droplet.

3. The system of claim 1, further comprising a pump integrated into the chip to pump the first fluid from the input into the microfluidic channel.

4. The system of claim 2, wherein the fluid actuator further comprises an inertial pump.

5. The system of claim 2, wherein the fluid actuator is selected from a group of fluid actuators consisting of a thermal actuator, a piezo-membrane based actuator, an electrostatic membrane actuator, a driven mechanical/impact driven membrane actuator, a magnetostrictive driven actuator, and an electrochemical actuator.

6. The system of claim 1, further comprising an active element integrated into the chip along the microfluidic channel.

7. The system of claim 1, wherein the sensor is operable to sense a characteristic of the droplet of the second fluid.

8. The system of claim 1, further comprising an inertial pump integrated into the chip along the microfluidic channel.

9. The system of claim 1, further comprising a second droplet generator integrated into the chip to generate a second droplet of the second fluid, immiscible in the first fluid, and to inject the second droplet of the second fluid into the first fluid in the microfluidic channel.

10. The system of claim 9, wherein the first droplet of the immiscible fluid has a first size and wherein the second droplet of the immiscible fluid has a second size that is different than the first size of the first droplet of the immiscible fluid.

11. The system of claim 1, further comprising a second droplet generator integrated into the chip to generate a second droplet of a third fluid, immiscible within the first fluid, and to inject the second droplet into the first fluid in the microfluidic channel.

12. The system of claim 11, wherein the first droplet has a first size and wherein the second droplet has a second size different than the first size.

13. The system of claim 1, further comprising a controller to selectively activate the droplet generator.

14. An apparatus comprising:

a chip;

a microfluidic channel integrated into the chip;

a pump integrated into the chip and operable to move a first fluid within and along the microfluidic channel;

a droplet generator integrated into the chip and fluidically coupled to the microfluidic channel, the droplet generator configured to:

generate droplets of a second fluid, immiscible within the first fluid, and inject the droplets of the second fluid into the first fluid when the first fluid is present in the microfluidic channel wherein the droplet of the second fluid is injected into the first fluid without passing through air;

a sensor integrated into the chip along the microfluidic channel downstream of the droplet generator; and a controller communicatively coupled to the sensor and configured to:

determine, based on data from the sensor, a frequency at which droplets generated by the droplet generator pass a predetermined point in the microfluidic channel selectively activate the pump and the droplet generator based on the frequency.

15. The system of claim 6, wherein the active element comprises a fluid heater, a mixer, an agitator, a fluid marking device, or a combination thereof.

16. The system of claim 1, wherein a frequency of injecting the immiscible droplet of the immiscible fluid into the carrier fluid by the droplet generator is adjustable.

17. The apparatus of claim 14, wherein the controller is further configured to control a frequency at which the droplets are injected into the first fluid and a rate at which the droplets are conveyed along the microfluidic channel.

18. The system of claim 1, wherein the sensor is an impedance sensor.

19. The system of claim 1, wherein the sensor is an optical sensor.

20. The system of claim 7, further comprising a second sensor operable to count a number of cells or particles in the droplet of the second fluid.

* * * * *